United States Patent
Koch (10) Patent No.: US 10,035,415 B1
(45) Date of Patent: Jul. 31, 2018

(54) PROTECTION OF VEHICLE ENGINE FUEL COMPONENTS

(71) Applicant: Toyota Motor Engineering & Manufacturing North America, Inc., Erlanger, KY (US)

(72) Inventor: Samuel D. Koch, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 0 days.

(21) Appl. No.: 15/461,321

(22) Filed: Mar. 16, 2017

(51) Int. Cl.
*B60K 15/01* (2006.01)
*F02M 37/00* (2006.01)

(52) U.S. Cl.
CPC ........... *B60K 15/01* (2013.01); *F02M 37/007* (2013.01); *F02M 37/0017* (2013.01); *B60Y 2306/01* (2013.01); *B60Y 2410/114* (2013.01)

(58) Field of Classification Search
CPC . B60K 15/01; B60K 15/013; F02M 2200/185
See application file for complete search history.

(56) References Cited

U.S. PATENT DOCUMENTS

| | | | |
|---|---|---|---|
| 6,340,019 B1 * | 1/2002 | Eshleman | F02M 69/465 123/469 |
| 6,817,337 B1 * | 11/2004 | Siring | F02M 35/10144 123/195 A |
| 7,063,074 B2 | 6/2006 | Horibe et al. | |
| 7,392,782 B2 | 7/2008 | Fujii | |
| 8,028,673 B2 | 10/2011 | Olsen et al. | |
| 9,664,164 B2 * | 5/2017 | Imakita | F02M 55/025 |
| 9,776,501 B2 * | 10/2017 | Dominic | B60K 15/01 |
| 2007/0012501 A1 * | 1/2007 | Frank | B60K 15/01 180/232 |
| 2008/0217089 A1 * | 9/2008 | Takahata | F02M 59/102 180/271 |
| 2015/0101696 A1 | 4/2015 | Ishiki et al. | |
| 2015/0158530 A1 * | 6/2015 | Mikami | B62D 21/11 280/782 |
| 2015/0337784 A1 * | 11/2015 | Ishikawa | F02M 37/06 123/198 E |
| 2015/0360727 A1 * | 12/2015 | Miwa | B60K 15/01 280/124.109 |
| 2016/0230655 A1 | 8/2016 | Dominic | |

(Continued)

FOREIGN PATENT DOCUMENTS

| | | | | |
|---|---|---|---|---|
| EP | 1441122 A1 | | 7/2004 | |
| EP | 2821273 A1 * | | 1/2015 | ............. B60K 15/01 |
| JP | 2007176345 A * | | 7/2007 | |

*Primary Examiner* — Katy M Ebner
(74) *Attorney, Agent, or Firm* — Christopher G. Darrow; Darrow Mustafa PC (57) ABSTRACT

Vehicle engine systems and protectors for such systems are presented. The protector can include a first end that is operatively connected to an intake manifold of the engine system. The protector can include a second end positioned between a fuel component of the engine system and a vehicle firewall. The protector can include one or more hooks that extend from an outer surface of the protector near the second end. The hooks are configured to engage the vehicle firewall during an impact collision. In one or more arrangements, the hooks can be configured to pierce through the vehicle firewall during the impact collision.

20 Claims, 4 Drawing Sheets

(56) References Cited

U.S. PATENT DOCUMENTS

| | | | | |
|---|---|---|---|---|
| 2016/0236564 A1* | 8/2016 | Dominic | ................ | B60K 15/01 |
| 2016/0341160 A1 | 11/2016 | Dominic | | |
| 2017/0101031 A1* | 4/2017 | Ohashi | .............. | H01M 8/04201 |

* cited by examiner

PROTECTION OF VEHICLE ENGINE FUEL COMPONENTS

FIELD

The present disclosure relates in general to fuel components for vehicles, and, more particularly, to the protection of fuel components in vehicle engine systems.

BACKGROUND

Modern vehicles, such as passenger and commercial vehicles, have various components within vehicle engine systems. Examples of such components and systems can include fuel components, such as a fuel hose and fuel hose connectors. The fuel components can be subjected to various forces resulting from collisions, accidents, or impacts to the area of the vehicle near the engine system. For example, portions of the engine system can move relative to, and contact, other vehicle components. Under certain impact conditions, portions of the engine system can contact a vehicle firewall. Such contact can cause damage to engine components such as the fuel components.

SUMMARY

In one example, the present disclosure is directed to a vehicle engine system. The system includes an intake manifold, a fuel component, and a protector. The protector has a first end and a second end. The first end is operatively connected to the intake manifold and the second end is positioned between the fuel component and a vehicle firewall. The protector includes one or more hooks that extend from an outer surface of the protector near the second end. The hooks are configured to engage the vehicle firewall during an impact condition.

In another example, the present disclosure is directed to a protector for a vehicle engine system. The protector includes a body having a first end and a second end. The first end is configured to be operatively connected to the vehicle engine system. The second end is configured to be positioned between a fuel component and a vehicle firewall. The protector further includes one or more hooks extending from an outer surface of the body near the second end. The one or more hooks are configured to engage the vehicle firewall during an impact condition.

In yet another example, the present disclosure is directed to a vehicle engine system. The system includes an intake manifold and a protector. The protector includes a body having a first end and a second end. The first end is operatively connected to the intake manifold. The second end is positioned between a fuel hose connector and a firewall. The protector further includes one or more hooks extending from an outer surface of the body near the second end. The one or more hooks are configured to pierce through the firewall during an impact condition.

DETAILED DESCRIPTION

Arrangements described herein relate to the protection of components within vehicle engine systems. In one or more arrangements, a vehicle engine system may include an intake manifold, a fuel component, and a protector. The protector can include a first end that is operatively connected to the intake manifold. The protector can include a second end positioned between the fuel component and a vehicle firewall. The protector can include one or more hooks that extend from an outer surface of the protector near the second end. In some arrangements, the hooks are configured to engage the vehicle firewall during an impact collision. For example, the hooks can be configured to pierce through the vehicle firewall during the impact collision. In at least some instances, the protector can reduce or prevent failure to engine system components such as the fuel component in the event of external force application to the engine system.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are described with reference to FIGS. 1-5C, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figures 1, 2:
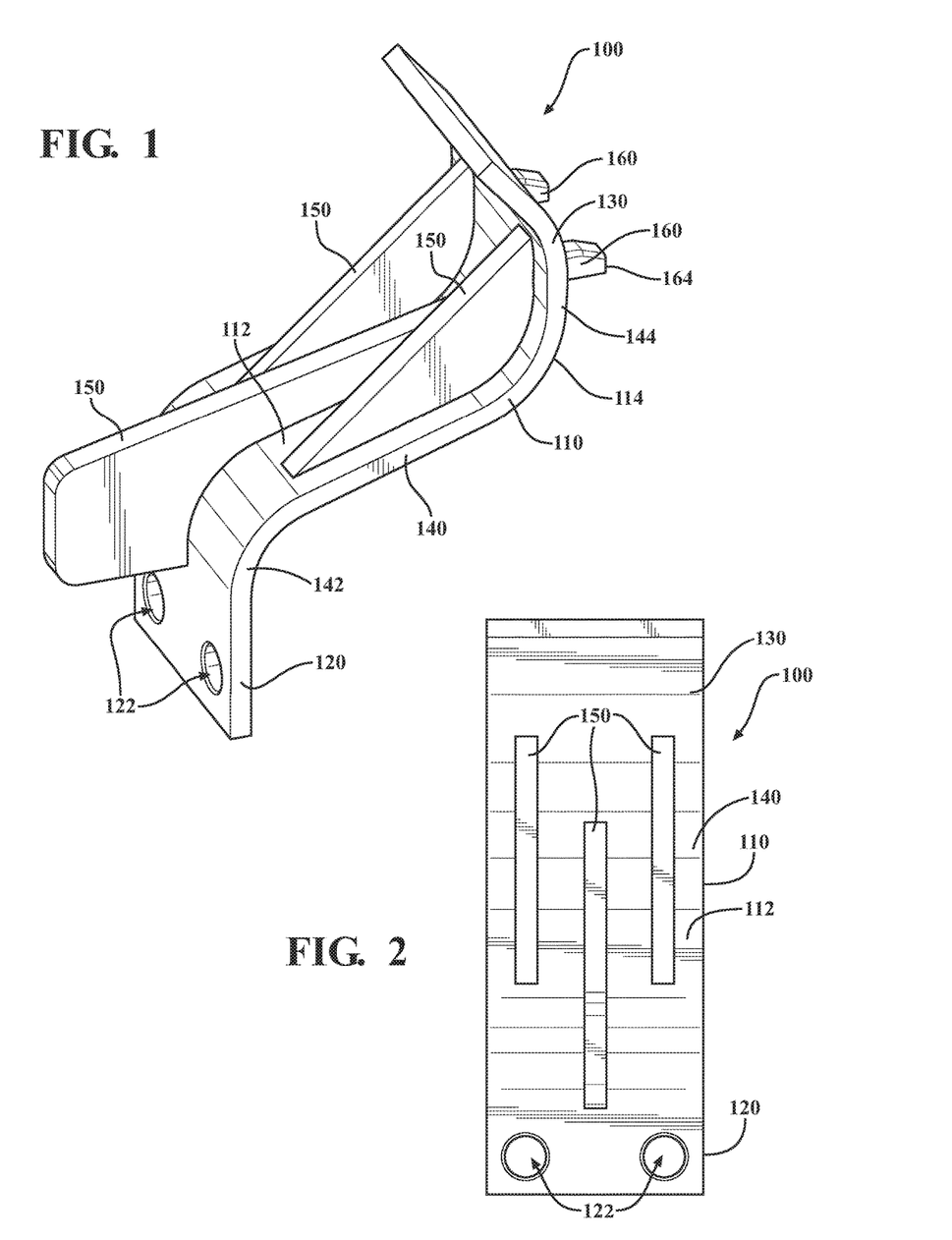
FIG. 1 shows an isometric view of an example of a protector for a fuel component.
FIG. 2 shows a front view of the protector of FIG. 1.
Figure 3:
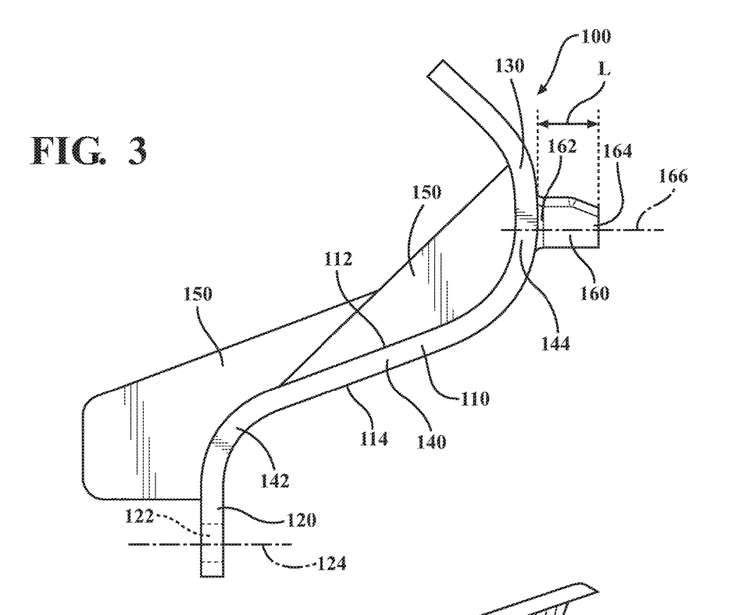
FIG. 3 shows a side view of the protector of FIG. 1.

Referring to FIGS. 1-3, an example of a protector 100 for a vehicle engine system is shown. Some of the various possible elements of the exemplary protector 100 will now be described. It will be understood that it is not necessary for the protector 100 to have all of the elements shown in FIGS. 1-3 or described herein. The protector 100 can have any combination of the various elements shown in FIGS. 1-3. In one or more arrangements, the protector 100 can include one or more elements in addition to one or more of the various elements shown in the Figures.

In one or more arrangements, the protector 100 can be used in connection with a vehicle. As used herein, "vehicle" means any form of motorized transport. In one or more implementations, the vehicle can be an automobile. While arrangements will be described herein with respect to automobiles, it will be understood that embodiments are not limited to automobiles. In some implementations, the vehicle can be a watercraft, an aircraft or any other form of motorized transport. In some implementations, arrangements described herein can be used in connection with non-motorized forms of transport. In some implementations, arrangements described herein can be used in one or more non-vehicular applications.

In one or more vehicular applications, the protector 100 can be used in connection with an engine system 200 of the vehicle. The engine system 200 is partially shown in FIG. 4, and discussed in further detail below. The protector 100 can be part of, associated with, or operatively connected to one or more portions of the engine system 200. As used herein, the term "operatively connected" can include direct and indirect connections, including connections without direct physical contact. Furthermore, "operatively connected" can include unitary physical structures, that is, structures formed from a single piece of material (e.g. by casting, stamping, machining, three-dimensional printing, etc.). The terms "engine" and "engine system" can be used interchangeably and can include any system or apparatus capable of converting energy into useful mechanical motion to power a vehicle. For instance, the engine system 200 can include internal combustion engines, fuel cells, and/or electric motors.

The protector 100 can be configured to block, shield, protect, prevent damage to, and/or reduce damage to, one or more fuel components within a vehicle. As used herein, the term "fuel components" includes any component that related to the transfer of a fuel throughout a vehicle. In some arrangements, the fuel components can include one or more fuel delivery components designed to provide fuel to an engine system. For example, as described in further detail below, the fuel components can include one or more fuel hoses and one or more fuel hose connectors. The fuel hoses can be low pressure fuel hoses. As used herein, "fuel" can include any fluid useable by a vehicle to produce energy. For example, fuel can include gasoline, oil, biofuel, hydrogen, ethanol, or any combination thereof.

In one or more arrangements, the protector 100 can include a body 110. The body 110 can include a first end 120, a second end 130, and a middle portion 140. The body 110, the first end 120, the second end 130, and the middle portion 140 can have any suitable configuration. In one or more arrangements, the body 110 can include one or more substantially planar portions. For example, the first end 120 and/or the middle portion 140 can include substantially planar portions. In one or more arrangements, the body 110 can include one or more non-planar portions, including one or more bends, curves, angles, twists, and/or steps. For example, the body 110 can include a first bend 142 located near the first end 120 and the middle portion 140. The body can include a second bend 144 near the middle portion 140 and/or the second end 130.

In one or more arrangements, the body 110 can include an inner surface 112 and an outer surface 114. The terms "inner" and "outer" are used herein for convenience only and are not intended to be limiting. In some arrangements, the inner surface 112 can face portions of the engine system 200 when the protector 100 is operatively connected to the engine system 200.

The body 110 can have any suitable thickness. In some arrangements, the thickness of the body 110 can be the distance between the inner surface 112 and the outer surface 114. In one or more arrangements, the body 110 can have a substantially uniform thickness. Alternatively, the body 110 can have a non-uniform thickness. For instance, the thickness of the body 110 can vary in one or more local areas or continuously in one or more directions (e.g. along a length and/or width). Additionally, the body 110 can have any suitable cross-sectional shape. In one or more arrangements, the body 110 can have a constant cross-sectional shape along at least a portion of the protector 100. Alternatively or in addition, the body 110 can have a varying cross-sectional shape along at least a portion of the protector 100.

In one or more arrangements, the first end 120 can be configured for operative connection to the engine system 200. In some arrangements, the first end 120 can be substantially planar. Alternatively or in addition, the first end 120 can include one or more non-flat or non-planar features. In some arrangements, the first end 120 can be shaped to substantially match the contour of a portion of the engine system 200. For instance, the first end 120 can include a substantially planar portion that matches a substantially planar contour of a portion of the engine system 200. The inner surface 112 near the first end 120 can contact a portion of the engine system 200.

Figure 5A:
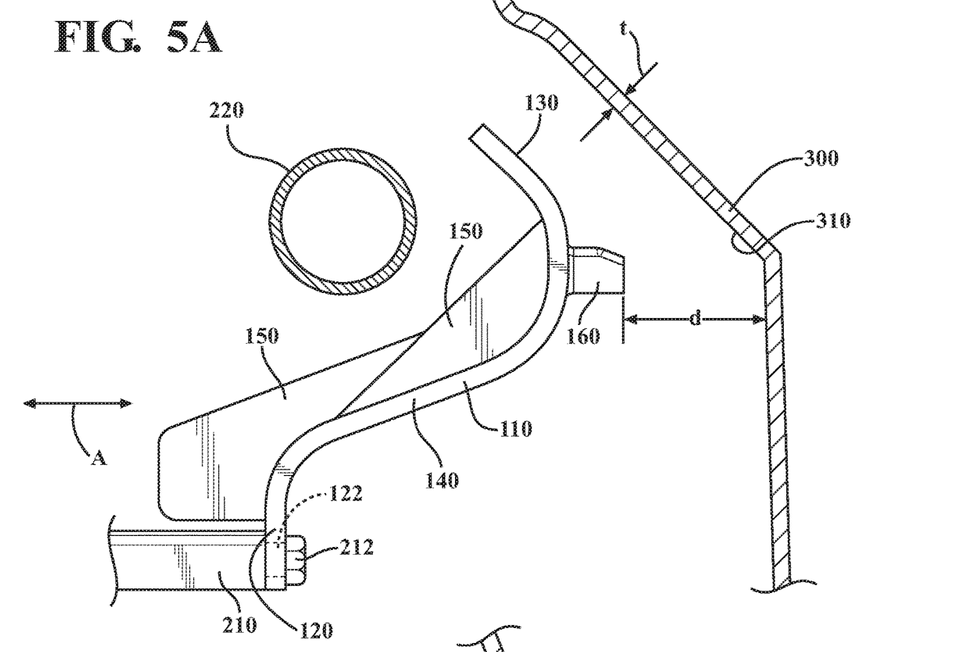
FIG. 5A shows a partial cross-sectional view of the vehicle system of FIG. 4 in a pre-impact condition.
Figure 5B:
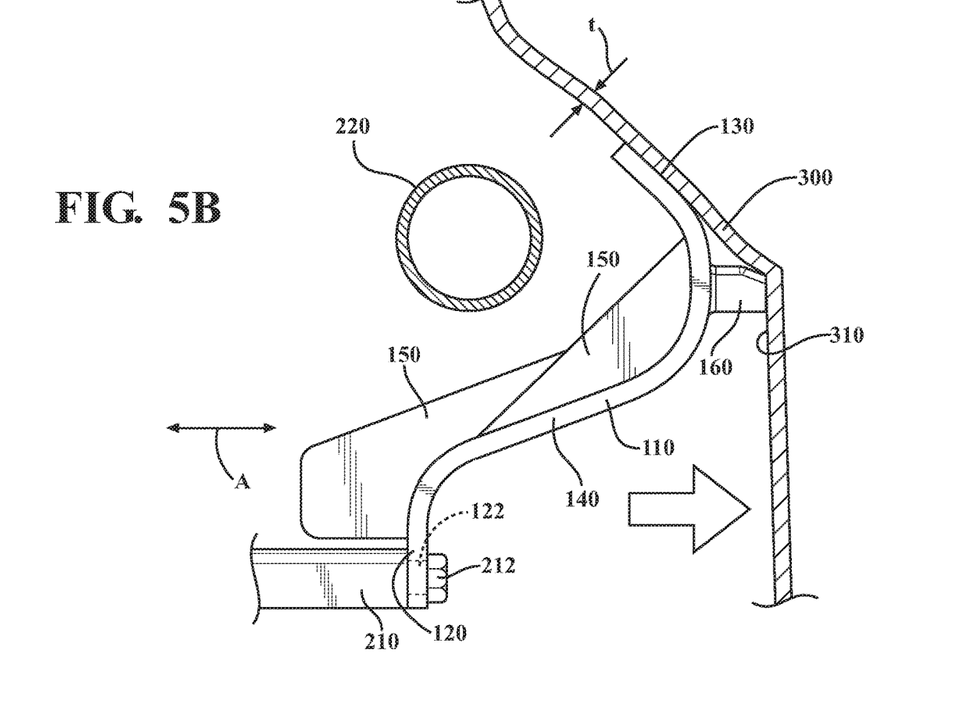
FIG. 5B shows a partial cross-sectional view of the vehicle system of FIG. 4 in a first example impact condition.
Figure 5C:
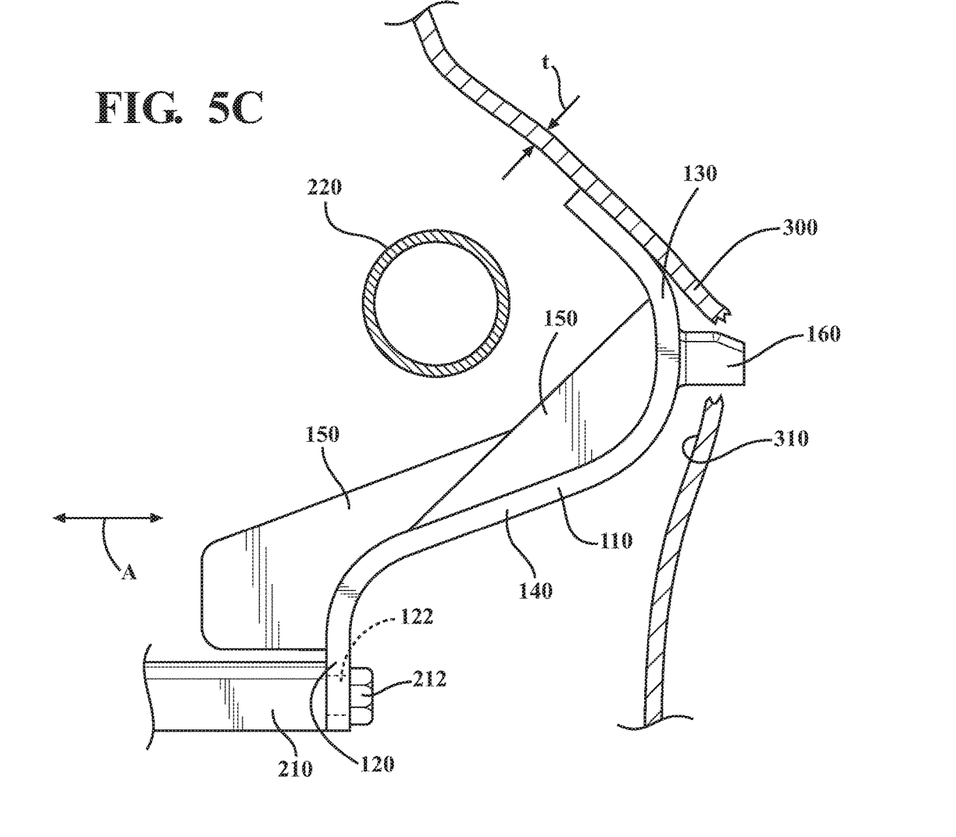
FIG. 5C shows a partial cross-sectional view of the vehicle system of FIG. 4 in a second example impact condition.

In one or more arrangements, the first end 120 can include one or more attachment features to allow the protector 100 to be operatively connected to an engine system. For instance, the first end 120 can include one or more apertures 122. The apertures 122 can be configured to receive and/or otherwise engage fasteners 212 (as shown in FIGS. 5A-5C). In some arrangements, the first end 120 can include two apertures 122 defined therein. As shown in FIG. 3, each of the aperture(s) 122 can be positioned about an associated aperture axis 124. In some non-limiting examples, the first end 120 can be operatively connected to an engine system by one or more fasteners, one or more other forms of mechanical engagement, one or more adhesives, one or more forms of welding, and/or one or more forms of brazing, just to name a few possibilities.

In one or more arrangements, the protector 100 can include one or more ribs 150 to provide structural strength to the protector. In one or more arrangements, the rib(s) 150 can extend from the inner surface 112 of the protector 100. In the non-limiting example shown in the Figures, the rib(s) 150 can extend substantially perpendicular to the inner surface 112. As used throughout this description, the term "substantially" includes exactly the term it modifies and slight variations therefrom. Thus, the term "substantially perpendicular" means exactly perpendicular and slight variations therefrom, such as within about +/−10 degrees for example. The term "substantially parallel" means exactly parallel and slight variations therefrom, such as within about +/−10 degrees for example. In some arrangements, the rib(s) 150 can extend from the second end 130 to the middle portion 140 as shown in FIGS. 1 and 3. Alternatively or in addition, the rib(s) 150 can extend from the first end 120 to the middle portion 140.

In one or more arrangements in which a plurality of ribs 150 are used, the ribs 150 can be substantially identical to each other at least with respect to their size, shape, and/or configuration. In one or more arrangements, at least one of the ribs 150 can be different from the other ribs 150 in one or more respects, such as size, shape, and/or configuration. In arrangements where there are two or more ribs 150, the ribs 150 can have any suitable orientation relative to one another. For instance, the ribs 150 can extend substantially parallel to one another.

As shown in FIGS. 1 and 3, the protector 100 can include one or more hooks 160. For instance, the protector 100 can include two hooks 160. Alternatively, the protector can have a single hook, or three or more hooks. The hook(s) 160 can be operatively connected to the body 110. For example, the hook(s) 160 and the body 110 can be formed from a unitary structure. In one or more arrangements, the hook(s) 160 can extend outward from the outer surface 114 of the protector 100. The hook(s) 160 can be located in any suitable location along the protector 100. In one or more arrangements, the hook(s) 160 can be positioned such that the hook(s) 160 are the portions of the protector farthest from the engine system 200. In some arrangements, the hook(s) 160 can be positioned near the second bend 144 and/or the second end 130.

In one or more arrangements, and as shown in FIG. 3, the hook(s) 160 can extend from a base 162 to a tip 164. In one or more arrangements, each of the hook(s) 160 can extend along an associated hook axis 166. Each hook 160 can have lengths L, wherein the length L can be a distance from the tip 164 to the outer surface 114. In one or more arrangements, the hook(s) 160 can be tapered. That is, a cross-sectional shape of each hook 160 can vary along portions of the length L. For instance, the hook(s) 160 can be tapered such that the tip 164 has a cross-sectional shape with a smaller surface area than a cross-sectional shape taken near the base 162. Alternatively, the hooks) 160 can have constant cross-sectional shapes along their associated lengths L.

In one or more arrangements, the hook(s) 160 can extend substantially perpendicular to other portions of the protector 100. For instance, the hook(s) 160 can extend substantially perpendicular to a portion of the outer surface 114 near the first end 120. In some arrangements, the hook axis 166 can extend substantially parallel to the aperture axis 124, as shown in FIG. 3.

In one or more arrangements in which a plurality of hooks 160 are used, the hooks 160 can be substantially identical to each other at least with respect to their size, shape, and/or configuration. In one or more arrangements, at least one of the hooks 160 can be different from the other hooks 160 in one or more respects, such as size, shape, and/or configuration. The protector 100 can be fixed in size, shape, and/or configuration. Alternatively, the protector 100 can allow for the size, shape, and/or configuration to be adjustable. For example, one or more dimensions of the hook(s) 160 can be adjustable.

In one or more arrangements, the hook(s) 160 can be configured such that the hook(s) 160 can engage vehicle structure. For example, the hook(s) 160 can be configured to engage a firewall 300, as described below in reference to FIGS. 5A-5C. As used herein, "engage" can include any direct physical contact between two or more components. For example, the hook(s) 160 can engage the firewall 300 through direct contact between one or more surfaces of the hook(s) 160 and the firewall 300. Alternatively or in addition, the hook(s) 160 can engage the firewall 300 by piercing, tearing, denting, or otherwise deforming the firewall 300. For example, the hook(s) 160 can be configured to pierce through a portion of the firewall 300.

Figure 4:
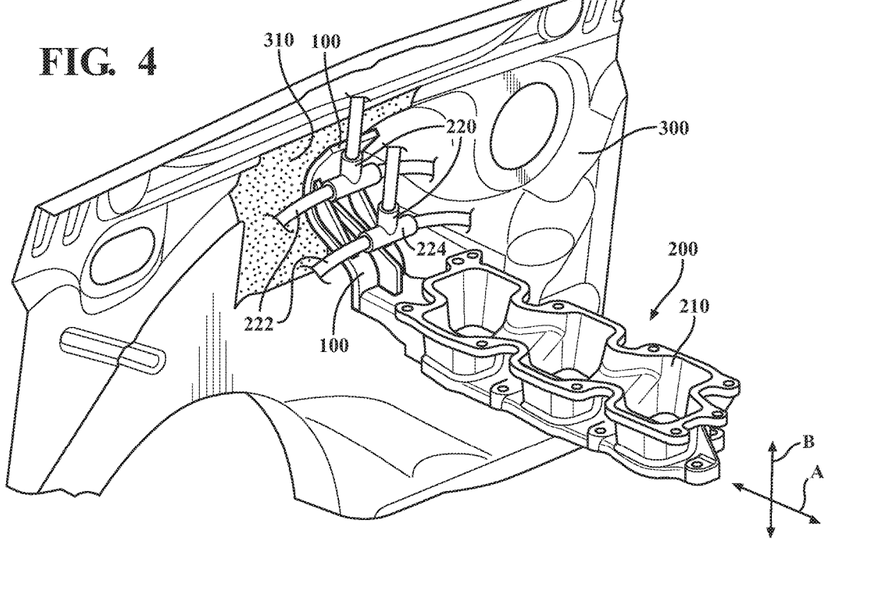
FIG. 4 shows a portion of a vehicle system including the protector of FIG. 1.

The general environment in which the protector 100 can be used will now be described. Referring to FIG. 4, an example of an engine bay for a vehicle is partially shown. In some arrangements, the engine bay can include the engine system 200 and a firewall 300. The engine system 200, partially shown in FIG. 4, can include an intake manifold 210.

The intake manifold 210 can have any suitable size, shape, and/or configuration to introduce fuel and/or air to other portions of the engine system 200. The intake manifold 210 can be made of any suitable material. For instance, the intake manifold 210 can be made of one or more metals, such as aluminum or steel.

In one or more arrangements, the protector 100 can be operatively connected to the intake manifold 210. The operative connection between the protector 100 and the intake manifold 210 can be achieved in a variety of ways. For example, each of the protector 100 and the intake manifold 210 can include a contact surface, wherein each of the contact surfaces is configured and positioned to abut or contact the other. As previously mentioned, the first end 120 of the protector 100 can have one or more attachment features. For example, the first end 120 can include apertures 122. As shown in FIGS. 5A-5C, one or more fasteners 212 can operatively connect the protector 100 to the intake manifold 210 by engaging the apertures 122 and apertures defined in the intake manifold 210. The fasteners 212 can include bolts, screws, pins, and/or clips, just to name a few examples.

In one or more arrangements, the protector 100 can extend away from the intake manifold 210 in a longitudinal direction A and an elevational direction B. For example, the protector 100 can extend rearward in the longitudinal direction A and upward in the elevational direction B relative to the intake manifold 210 as shown in FIG. 4.

In one or more arrangements, the engine system 200 can include one or more fuel components 220. For instance, the engine system 200 can include one or more fuel hoses 222 and/or one or more fuel hose connectors 224. In one or more arrangements, the fuel hose(s) 222 and the fuel hose connector(s) 224 can be configured to move fuel within the engine system 200. For example, the fuel hose(s) 222 and the fuel hose connector(s) 224 can deliver fuel to the intake manifold 210 and/or one or more cylinder heads (not shown).

The fuel hose(s) 222 and the fuel hose connector(s) 224 can have any suitable configuration within engine system 200. For instance, the fuel hose(s) 222 and the fuel hose connector(s) 224 can be shaped, sized, configured, positioned, and/or operatively connected within the engine system 200 based on one or more factors, including, for example, safety, design, space, fuel flow requirements and/or material considerations or constraints. In some arrangements, portions of the fuel hose(s) 222 and/or the fuel hose connector(s) 224 can be located above and behind the intake manifold 210, as shown in FIG. 4.

With reference to FIG. 4, the protector 100 and the engine system 200 can be located near the firewall 300. The firewall 300 can partially define a rearward limit to an engine compartment or engine bay of a vehicle. The firewall 300 can be shaped, positioned, and/or connected within a vehicle in any suitable manner, such as, for example, based on any combination of safety, design, space, and/or material considerations or constraints. In some embodiments, the firewall 300 can include a firewall surface 310 that generally faces the protector 100 and/or the engine system 200. As further discussed below, during a vehicle crash or impact, portions of the protector 100 and/or the engine system 200 may contact the firewall surface 310 of the firewall 300. In one or more arrangements, firewall 300 can include a portion that extends with a substantially upright orientation.

In one or more arrangements, the protector 100 can be positioned between one or more fuel components 220 and the firewall 300. For instance, the protector 100 can be operatively connected at the first end 120 to the intake manifold 210 and extend between fuel hoses 222 and/or fuel hose connectors 224.

A non-limiting example of the protector 100 during an impact condition will now be described with reference to FIGS. 5A-5C. For purposes of this example, the protector 100 can be operatively connected to the intake manifold 210. FIG. 5A shows a partial cross-sectional view of the vehicle system in a pre-impact condition. As used herein, "pre-impact condition" includes any situation in which the protector 100 is not engaging the firewall 300. For instance, the pre-impact condition can include normal vehicle operating conditions. Alternatively, the pre-impact condition can be after a vehicle impact and prior to engagement of the protector 100 and the firewall 300. In a pre-impact condition, the protector 100 can be spaced a distance d from the firewall 300 in the longitudinal direction A.

FIG. 5B shows a partial cross-sectional view of the vehicle system in a first example impact condition. In the first example impact condition, the engine system 200 and the protector 100 can move toward, and engage, the firewall 300. For example, the intake manifold 210 and the protector 100 can move relative to the firewall 300 along the longitudinal direction A. In one or more arrangements, the protector 100 can engage the firewall 300 by making direct contact with the firewall surface 310. For example, the protector 100 can contact the firewall surface at the hooks 160 and/or the second end 130. In some arrangements, the protector 100 can shield and prevent the firewall 300 from making contact with the fuel component 220.

FIG. 5C shows a partial cross-sectional view of the vehicle system in a second example impact condition. As used herein, "second example impact condition" includes any condition in which the protector 100 engages the firewall 300 such that a portion of the firewall 300 breaks, tears, or otherwise fails. For example, the second example impact condition can occur after a vehicle collision and after the first example impact condition. In the second example impact condition, the engine system 200 and the protector 100 can move farther than in the first example impact condition. In this example, the protector 100 can engage the firewall 300 such that the hooks 160 pierce through a portion of the firewall 300. As used herein, "pierce" refers to any condition which the hook(s) 160 at least partially extend through the firewall 300. In some arrangements, the length L of the hook(s) 160 can be greater than a thickness t of the firewall 300 allowing the hook(s) 160 to pierce through and extend past the firewall 300.

In one or more arrangements, the piercing of the firewall 300 by the hooks 160 can provide protection benefits to the fuel component 220. As one example, the piercing can weaken the firewall 300. In such a situation, the weakened firewall 300 can tear, dent, break, and/or otherwise fail, allowing the protector 100 and the fuel component 220 to experience less reaction force applied by the firewall 300. As another non-limiting example, the hook(s) 160 can pierce through and grab onto, or otherwise connect to, the firewall 300. This can cause the hook(s) 160 to be operatively connected to a particular portion of the firewall 300. In one or more arrangements, this can prevent and/or reduce slippage of the firewall 300 along and/or over the protector 100. Also, by grabbing onto the firewall 300, forces from impact conditions can be transferred as a moment acting about the first end 120.

In one or more arrangements, methods for positioning the protector 100 can include bringing together the protector 100 with the engine system 200 with one or more impact conditions in mind. As used herein, the term "bringing together" or "brought together" means any movement, positioning, and/or manipulation of the protector 100 with respect to the engine system 200. For example, the protector 100 can be operatively connected to the engine system 200 at the first end 120 by the fasteners 212. In one or more arrangements, the movement of the engine system 200 can be determined for an impact condition. For example, physical or computer-aided simulation or testing can determine the approximate movement and position of the engine system 200 during an impact condition. As described above, in some arrangements, the protector 100 can be arranged based on the engine system 200 movement during the impact condition. For example, the protector 100 can be arranged such that the hook(s) 160 engage the firewall 300 during the impact condition.

Methods can include other steps that are not shown here, and in fact, methods are not limited to including every step described. Furthermore, the steps detailed here as part of the method for providing a protector are not limited to this particular chronological order. Indeed, some of the steps can be performed in a different order than what is described and/or at least some of the steps can occur simultaneously.

It will be appreciated that arrangements described herein can provide numerous benefits, including one or more of the benefits mentioned herein. For example, arrangements described herein can reduce and/or eliminate damage to certain engine components. For instance, the protector can reduce and/or eliminate damage to fuel components during impact conditions of a vehicle. The protector can absorb and/or transfer forces during the impact conditions. In some arrangements, the protector can include hooks that are configured to engage a vehicle firewall. For instance, the hooks can be configured to pierce through portions of the firewall, which can transfer forces to reduce damage to the fuel components. Rather than allowing the firewall to directly contact the fuel components, the protector can shield the fuel components and transfer force to other portions of the engine system. Estimations or determinations of the engine system position and movement can be determined to shape and position the protector. Furthermore, the protector can provide other benefits, such as improved noise, vibration, and harshness (NVH) characteristics.

As used herein, the terminology "example", "embodiment", "implementation", "aspect", "feature", or "element" indicate serving as an example, instance, or illustration. Unless expressly indicated, any example, embodiment, implementation, aspect, feature, or element is independent of each other example, embodiment, implementation, aspect, feature, or element and can be used in combination with any other example, embodiment, implementation, aspect, feature, or element.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A vehicle engine system, the system comprising:
an intake manifold;
a fuel component; and
a protector, the protector having a first end, a second end, and a middle portion that extends between the first and second ends, the first end being operatively connected to the intake manifold, the second end being positioned between the fuel component and a vehicle firewall, and the middle portion being separated from the second end by a second bend, the protector having one or more hooks extending from an outer surface of the protector at the second bend in the second end, the hooks being configured to engage the vehicle firewall during an impact condition.

2. The system of claim 1, wherein the one or more hooks includes two hooks, the two hooks each extending from the outer surface at an orientation substantially perpendicular to the outer surface.

3. The system of claim 1, wherein the one or more hooks are tapered.

4. The system of claim 1, wherein the one or more hooks are positioned higher than the first end in an elevational direction.

5. The system of claim 1, wherein the fuel component is in fluid communication with the intake manifold, and the fuel component is a fuel hose or a fuel hose connector.

6. The system of claim 1, further including one or more ribs extending from an inner surface of the protector.

7. The system of claim 6, wherein the one or more ribs extend substantially perpendicular to the inner surface.

8. The system of claim 7, wherein the one or more ribs includes two or more ribs, and the two or more ribs are substantially parallel to one another.

9. The system of claim 1, wherein the middle portion includes a substantially planar portion, the middle portion being separated from the first end by a first bend.

10. A protector for a vehicle engine system, the protector comprising:
   a body having a first end, a second end, and a middle portion that extends between the first and second ends, the first end being configured to be operatively connected to the vehicle engine system, the second end being configured to be positioned between a fuel component and a vehicle firewall, and the middle portion being separated from the second end by a second bend; and
   one or more hooks extending from an outer surface of the body at the second bend in the second end, the one or more hooks being configured to engage the vehicle firewall during an impact condition.

11. The protector of claim 10, wherein the one or more hooks includes two hooks, the two hooks each extending from the outer surface at an orientation substantially perpendicular to the outer surface.

12. The protector of claim 10, wherein the one or more hooks are tapered.

13. The protector of claim 10, further including one or more ribs extending from an inner surface of the protector.

14. The protector of claim 13, wherein the one or more ribs extend from the inner surface at an orientation substantially perpendicular to the inner surface.

15. The protector of claim 14, wherein the one or more ribs includes two or more ribs, and the two or more ribs are substantially parallel to one another.

16. A vehicle engine system, the system comprising:
   an intake manifold; and
   a protector, the protector comprising:
      a body having a first end, a second end, and a middle portion that extends between the first and second ends, the first end being operatively connected to the intake manifold, the second end being positioned between a fuel hose connector and a firewall, and the middle portion being separated from the second end by a bend; and
      one or more hooks extending from an outer surface of the body at the second bend in the second end, the one or more hooks being configured to pierce through the firewall during an impact condition.

17. The system of claim 16, wherein the one or more hooks includes two hooks, the two hooks each extending from the outer surface at an orientation substantially perpendicular to the outer surface.

18. The system of claim 16, wherein the one or more hooks are tapered.

19. The system of claim 16, further including one or more ribs extending from an inner surface at an orientation substantially perpendicular to the inner surface.

20. The system of claim 19, wherein the one or more ribs includes two or more ribs, and the two or more ribs are substantially parallel to one another.

* * * * *